(12) United States Patent
Mattana et al.

(10) Patent No.: US 9,874,006 B1
(45) Date of Patent: Jan. 23, 2018

(54) MODULAR ROOF MOUNTING SYSTEM

(71) Applicant: INHABIT SOLAR, LLC, New York, NY (US)

(72) Inventors: Michael Mattana, Syosset, NY (US); Oisin Clancy, New York, NY (US)

(73) Assignee: INHABIT SOLAR, LLC, New York, NY (US)

( * ) Notice: Subject to any disclaimer, the term of this patent is extended or adjusted under 35 U.S.C. 154(b) by 0 days.

(21) Appl. No.: 15/225,077

(22) Filed: Aug. 1, 2016

(51) Int. Cl.
  E04B 1/19 (2006.01)
  H02S 20/24 (2014.01)

(52) U.S. Cl.
  CPC .............. E04B 1/19 (2013.01); H02S 20/24 (2014.12)

(58) Field of Classification Search
  CPC .............. E04B 1/19; E04B 2001/193; E04B 2001/1936; E04B 2001/1957; E04B 2001/1975; E04B 2001/2415; E04B 2001/246; H02S 20/24; H02S 20/00; H02S 20/10; H02S 20/23; F24J 2/5245; F24J 2/5264; F24J 2/5232; F24J 2/526; F24J 2/5239; F24J 2/523; F24J 2/5254; F24J 2/5233; Y02E 10/47; Y02B 10/12
  USPC ................. 52/653.1, 653.2, 654.1, 655.1
  See application file for complete search history.

(56) References Cited

U.S. PATENT DOCUMENTS

| 2,709,108 | A | * | 5/1955 | Eggert, Jr. | B62D 25/105 29/416 |
| 4,577,449 | A | * | 3/1986 | Celli | E04D 1/2403 182/186.8 |
| 5,890,560 | A | * | 4/1999 | Sloop | E06C 1/34 182/107 |
| 6,089,350 | A | * | 7/2000 | Hankins | E06C 7/46 182/107 |
| 7,743,886 | B2 | * | 6/2010 | Feemster, Jr. | E06C 7/46 182/107 |
| 8,479,459 | B2 | * | 7/2013 | Tucker | H01L 31/045 126/623 |
| 8,701,359 | B2 | * | 4/2014 | Packer | E04B 1/24 403/270 |
| 8,881,484 | B2 | * | 11/2014 | Zante | F24J 2/5232 52/173.3 |
| 8,881,491 | B2 | * | 11/2014 | Christopoulos | E04H 9/022 52/167.1 |
| 8,943,765 | B2 | * | 2/2015 | Danning | H02S 20/23 52/126.1 |
| 9,003,738 | B1 | * | 4/2015 | Evans, Jr. | E04B 5/12 52/702 |
| 2006/0205184 | A1 | * | 9/2006 | Oswald | H01L 31/022425 438/463 |
| 2008/0105054 | A1 | * | 5/2008 | Kanai | G01C 19/5649 73/514.29 |
| 2008/0216418 | A1 | * | 9/2008 | Durham | E04H 6/025 52/73 |
| 2009/0015019 | A1 | * | 1/2009 | Donaghey | F03D 3/002 290/55 |

(Continued)

Primary Examiner — James M Ference
(74) Attorney, Agent, or Firm — Edward Ryan, Esq.

(57) ABSTRACT

A mounting structure includes a mounting system configured to mount the mounting structure to an existing architectural feature. One or more legs are each connected to the mounting system. One or more wishbone structures, each including three flat sections connected at fixed angles with respect to one another, have end sections that are parallel to one another. Each wishbone structure is connected to one of the one or more legs.

18 Claims, 6 Drawing Sheets

(56) References Cited

U.S. PATENT DOCUMENTS

| | | | |
|---|---|---|---|
| 2009/0101195 A1* | 4/2009 | Reynolds | B32B 38/1866 136/246 |
| 2009/0230265 A1* | 9/2009 | Newman | F24J 2/5205 248/229.11 |
| 2010/0005752 A1* | 1/2010 | Hawkins | E04B 1/1903 52/655.1 |
| 2010/0108113 A1* | 5/2010 | Taggart | E04F 10/08 135/96 |
| 2011/0005560 A1* | 1/2011 | Nair | E04H 15/14 135/96 |
| 2011/0079265 A1* | 4/2011 | Brescia | E04B 2/88 136/244 |
| 2011/0094088 A1* | 4/2011 | Potter | E04H 6/025 29/592.1 |
| 2011/0157733 A1* | 6/2011 | Werner | F24J 2/14 359/871 |
| 2011/0187310 A1* | 8/2011 | Gochenaur | H01M 10/46 320/101 |
| 2011/0247675 A1* | 10/2011 | LeMay | F24J 2/405 136/244 |
| 2011/0252724 A1* | 10/2011 | Heisler | E04B 7/022 52/173.3 |
| 2011/0297205 A1* | 12/2011 | Stevenson | E04D 5/00 136/245 |
| 2012/0025536 A1* | 2/2012 | Kimberg | F03D 9/007 290/55 |
| 2012/0056066 A1* | 3/2012 | Habdank | F24J 2/5232 248/419 |
| 2012/0060898 A1* | 3/2012 | Ahlgren | F24J 2/0477 136/248 |
| 2012/0180407 A1* | 7/2012 | Rees | E04C 3/08 52/173.3 |
| 2012/0298189 A1* | 11/2012 | Sasakura | H02G 3/16 136/251 |
| 2013/0003274 A1* | 1/2013 | Turziano | H01R 4/64 361/679.01 |
| 2013/0061913 A1* | 3/2013 | Willham | H01L 27/301 136/251 |
| 2013/0167472 A1* | 7/2013 | Jenkins | H01L 31/0422 52/745.06 |
| 2013/0168340 A1* | 7/2013 | Urban | F24J 2/5205 211/41.1 |
| 2013/0180089 A1* | 7/2013 | Seery | F24J 2/5211 24/460 |
| 2013/0205692 A1* | 8/2013 | Hubbard | F24J 2/4621 52/173.3 |
| 2013/0212977 A1* | 8/2013 | Hemphill | E04B 1/24 52/843 |
| 2013/0220397 A1* | 8/2013 | Conger | F24J 2/5241 136/244 |
| 2013/0240466 A1* | 9/2013 | Sponseller | H01L 31/0422 211/26 |
| 2013/0269750 A1 | 10/2013 | Tucker | |
| 2013/0269752 A1* | 10/2013 | Corio | H01L 31/0422 136/246 |
| 2013/0276382 A1* | 10/2013 | Workman | E04H 15/44 52/63 |
| 2013/0276867 A1* | 10/2013 | Wildes | H01L 31/0422 136/246 |
| 2013/0283710 A1* | 10/2013 | Laurin | E04B 1/61 52/173.3 |
| 2013/0312812 A1* | 11/2013 | Meyer | F24J 2/16 136/246 |
| 2014/0042749 A1* | 2/2014 | Siegel | F03B 13/183 290/53 |
| 2014/0069485 A1* | 3/2014 | Rawlings | F24J 2/52 136/251 |
| 2014/0076378 A1* | 3/2014 | Hamilton | H02S 20/10 136/245 |
| 2014/0076383 A1* | 3/2014 | Potter | H01L 31/02 136/251 |
| 2014/0077055 A1* | 3/2014 | Hamilton | H02S 20/10 248/560 |
| 2014/0083504 A1* | 3/2014 | Kuo | H01L 31/042 136/259 |
| 2014/0090693 A1* | 4/2014 | Thomas | H01L 31/042 136/251 |
| 2014/0102016 A1* | 4/2014 | Hemingway | F24J 2/5256 52/173.3 |
| 2014/0102517 A1* | 4/2014 | Meine | H01L 31/18 136/251 |
| 2014/0109954 A1* | 4/2014 | Kanbara | H01L 31/042 136/251 |
| 2014/0130429 A1* | 5/2014 | Livsey | E04B 1/7069 52/173.3 |
| 2014/0130847 A1* | 5/2014 | West | F24J 2/5211 136/251 |
| 2014/0144480 A1* | 5/2014 | Lee | H01L 31/048 136/244 |
| 2014/0144490 A1* | 5/2014 | Richardson | E04H 6/025 136/251 |
| 2014/0157694 A1* | 6/2014 | Jenkins | F24J 2/5201 52/173.3 |
| 2014/0158649 A1* | 6/2014 | Al-Haddad | F24J 2/525 211/41.1 |
| 2014/0203566 A1* | 7/2014 | Yuan | F03D 9/002 290/55 |
| 2014/0216529 A1 | 8/2014 | Tucker | |
| 2014/0224303 A1* | 8/2014 | Herwig | H01L 31/0488 136/251 |
| 2014/0230365 A1* | 8/2014 | Hemphill | E04C 3/30 52/843 |
| 2014/0230886 A1* | 8/2014 | Werner | F24J 2/5264 136/251 |
| 2014/0261387 A1* | 9/2014 | Hansen | F24J 2/02 126/608 |
| 2014/0283467 A1* | 9/2014 | Chabas | E04D 3/30 52/173.3 |
| 2014/0290716 A1* | 10/2014 | Stubbs | H02S 20/30 136/251 |
| 2014/0290718 A1* | 10/2014 | Jackson, Jr. | F24J 2/5203 136/251 |
| 2014/0291463 A1* | 10/2014 | Kanczuzewski | F16M 13/02 248/237 |
| 2014/0299179 A1* | 10/2014 | West | H01L 31/042 136/251 |
| 2014/0305497 A1* | 10/2014 | Petrosillo | F03D 9/007 136/251 |
| 2014/0326687 A1* | 11/2014 | Leary | F24J 2/5239 211/41.1 |
| 2014/0338729 A1 | 11/2014 | Newman et al. | |
| 2014/0338732 A1* | 11/2014 | Nishioka | H01L 31/18 136/251 |
| 2014/0360562 A1* | 12/2014 | Hartelius | F24J 2/5233 136/251 |
| 2014/0360951 A1* | 12/2014 | Ilzhoefer | F24J 2/5233 211/41.1 |
| 2014/0366465 A1* | 12/2014 | Bragagna | H02S 20/00 52/173.3 |
| 2014/0366929 A1* | 12/2014 | Blau | H02S 20/32 136/246 |
| 2015/0014496 A1* | 1/2015 | Roensch | H01L 31/042 248/201 |
| 2015/0020874 A1* | 1/2015 | McPheeters | F24J 2/5233 136/251 |
| 2015/0034575 A1* | 2/2015 | Warpup | H02S 20/10 211/41.1 |
| 2015/0041610 A1* | 2/2015 | Hartelius | F24J 2/5232 248/500 |
| 2015/0059833 A1* | 3/2015 | Yang | F24J 2/5254 136/251 |
| 2015/0068590 A1* | 3/2015 | West | F24J 2/5211 136/251 |
| 2015/0144178 A1* | 5/2015 | Sakai | H02S 20/10 136/246 |
| 2015/0157694 A1* | 6/2015 | Burton | A61K 38/363 514/13.7 |

(56) References Cited

U.S. PATENT DOCUMENTS

| | | |
|---|---|---|
| 2015/0180405 A1 | 6/2015 | West et al. |
| 2015/0184896 A1* | 7/2015 | Lippert .................. H02S 20/00 211/41.1 |
| 2015/0229262 A1 | 8/2015 | Rawlings et al. |
| 2015/0252587 A1* | 9/2015 | Lovley, II ............... E04H 15/58 135/121 |
| 2015/0326170 A1 | 11/2015 | Livsey et al. |
| 2015/0340987 A1 | 11/2015 | Ilzhoefer |
| 2015/0357964 A1* | 12/2015 | McPheeters ........... F24J 2/5205 136/251 |
| 2015/0381105 A1 | 12/2015 | Al-Haddad et al. |

* cited by examiner

MODULAR ROOF MOUNTING SYSTEM

BACKGROUND

Technical Field

The present invention relates to structures for mounting panels and creating enclosed spaces above roofs and, more particularly, to a modular system for mounting such panels on existing roofs without the need for significant retrofit or construction.

Description of the Related Art

As city population density increases and cities themselves expand to occupy additional land area, the impact of cities on the environment increases. In particular, the effect of city space on land albedo, green spaces, and heat entrapment can be significant. As a result, a sustainable architecture movement has arisen that seeks to minimize the negative environmental impact of buildings.

One prominent feature of sustainable architecture is to maximize the utility of otherwise unused roof spaces. Buildings are increasingly being designed or retrofitted to include, for example, green spaces or solar panels to minimize the environmental impact of the building and to obtain some ecological or energy production benefit from what would otherwise be a barren, flat area. In particular, flat roofed buildings in dense urban areas prove challenging and expensive due to their relative small footprint, the multiplicity of mechanical and building service obstructions, fire code limitations, and zoning restrictions.

However, introducing such features to existing buildings can be prohibitively expensive, as existing solutions often must be custom-built canopies and racking structures to fit the particular roof in question and require significant expertise in design and construction. This limits the proliferation of sustainable and renewable energy development.

SUMMARY

A structure includes a mounting system configured to mount the mounting structure to an existing architectural feature. One or more legs are each connected to the mounting system. One or more wishbone structures, each including three flat sections connected at fixed angles with respect to one another, have end sections that are parallel to one another. Each wishbone structure is connected to one of the one or more legs.

A structure includes a mounting system configured to mount the structure to an existing architectural feature. A plurality of legs are each connected to the mounting system. A plurality of wishbone structures are connected to a central spine, with wishbone structure having three flat sections connected at fixed angles with respect to one another. The end sections of each wishbone structure are parallel to one another. Each wishbone structure is connected to one of the plurality of legs at a first end by an insert that slots into the leg and the wishbone structure and to the central spine at a second end by a splice connection that inserts into the wishbone structure.

A structure includes a mounting system that has a pair of mounting plates and one or more tension bars connecting the pair of mounting plates. The mounting system is configured to mount the structure to an existing architectural feature. A plurality of legs are each connected to the mounting system. A central spine includes a plurality of spine pieces connected to one another by splice connections. A plurality of wishbone structures are connected to the central spine. Each wishbone structure has three flat sections connected at fixed angles with respect to one another, with end sections of each wishbone structure being parallel to one another. Each wishbone structure is connected to one of the plurality of legs at a first end by an insert that slots into the leg and the wishbone structure and to the central spine at a second end by the splice connections, which insert into respective wishbone structures.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present principles provide a modularly expandable framework for construction on rooftops that fits onto existing roof structures and provides a strong, lightweight, easy-to-assemble mounting system that facilitates the installation of solar panels on existing rooftops with a minimum of effort.

The present embodiments provide, in particular, a "wishbone" upper framework using modular pieces angled to provide support for a significant amount of weight. In addition, the present embodiments employ a mounting system that does not involve making incisions in the roof membrane or the construction of a new structure. Instead, the present embodiments make use of existing roof parapets to support the weight of the framework and any panels mounted thereto. It should be recognized that, although the present embodiments are described in the specific context of roof-mounted environments, it should be understood that the present principles may be applied equally to other contexts. Furthermore, the structural shape of the wishbone framework is designed to withstand heavy wind and snow loads, making the structure durable and suitable for year-round outdoor use.

Figure 1:
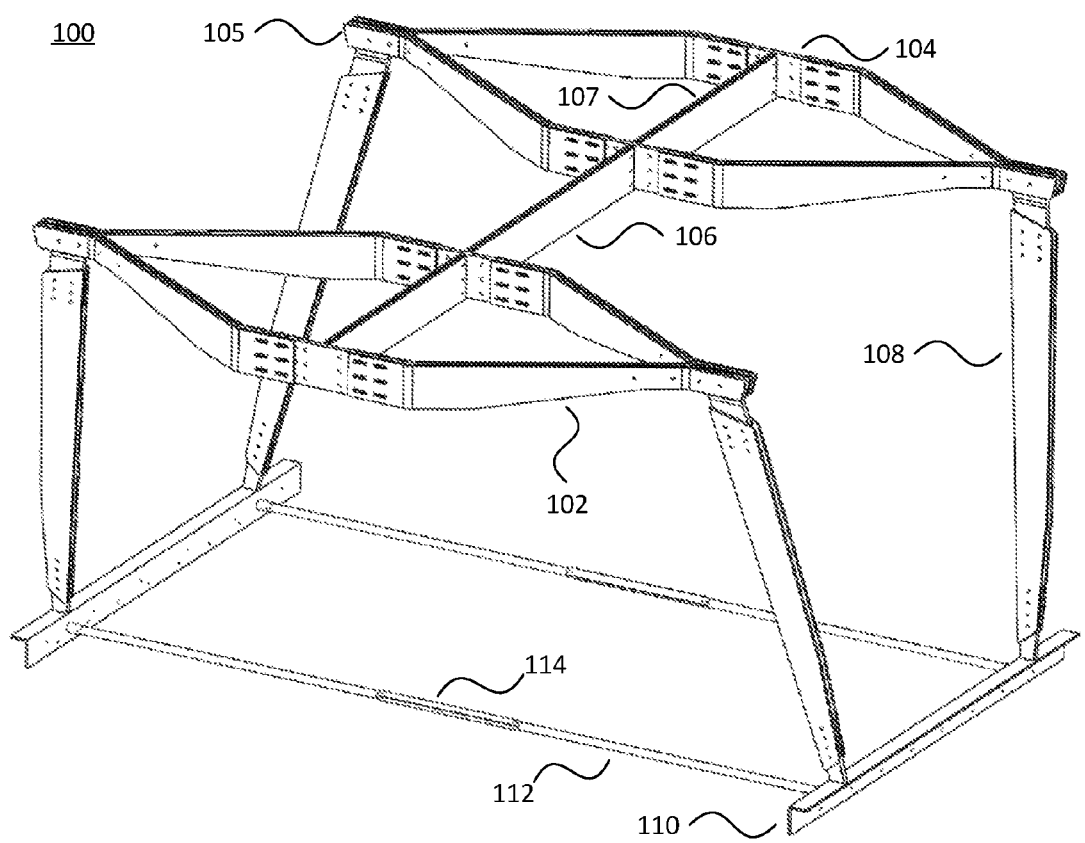
FIG. 1 is a diagram of a mounting system in accordance with the present principles.

Referring now to FIG. 1, a perspective view of a mounting system 100 is shown. The mounting system includes a set of wishbone structures 102. Each wishbone structure 102, described in greater detail below, is attached to neighboring wishbone structures 102 and to a central spine 106 via splice connections 104. The wishbone structures 102 are furthermore attached to upright supports 108 via inserts 105. The central spine 106 is itself formed from a series of individual pieces 107, joined together at their respective ends by the splice connections 104. The top and bottom edges of the wishbone structures 102 are configured to establish a plane to which additional structures, such as solar panels or decorations, may be mounted.

The legs 108 are supported at their bottom ends by base plates 110. The base plates 110, in turn, may be mounted to existing roof structures and will be described in greater detail below. Between the base plates 110 are one or more tension bars or cables 112, configured to provide a constant force on the base plates 110. In particular, without the tension bars 112, the mounting system 100 would exert an outward lateral force on the existing roof structures. In such a scenario, even movement by a fraction of an inch could cause the existing roof structures to crack. The tension bars 112 prevent this outward force from reaching the roof structures, creating a closed loop in the mounting system 100. In this manner, the mounting system 100 is stably attached to the roof, for example by mounting the base plates 110 to existing parapets, without destructive changes to the roof surface itself. Since the existing roof structures are not likely to be perfectly level to one another, the base plates 110 with the connected tension bars 112 act as a single structure to establish a completely level surface between the parapets. Additionally it should be noted that, although the tension bars 112 are described herein as being rigid bars connected by an adjustable splicing piece 114, cables or wires may be used instead.

It should be understood that the mounting system 100 shown in FIG. 1 is just one configuration that is possible according to the present embodiments. Applicants contemplate that smaller configurations are possible, for example by excluding the outermost pairs of wishbone structures 102, and that larger configurations are also possible, for example by repeating wishbone structures 102 with additional legs 108 and additional base plates 110 or, alternatively, longer base plates 110.

As such, there is significant flexibility in the dimensions of the mounting system 100. Along a longitudinal dimension (defined as the dimension parallel to the central spine 106), the length can be increased by addition additional wishbone structures 102, spine pieces 107, and splice connections 104. Along a perpendicular dimension (defined as the dimension perpendicular to the central spine 106 in the plane defined by the wishbone structures 102), the length can be increased by mounting the wishbone structures 102 to the splice connections 104 at different points and the splice connections 104 and/or wishbone structures 102 themselves can be increased in length. In an alternative embodiment, the size of the mounting system 100 can be increased with the addition of one or more additional central spines, with connections between the central spines for stability.

In one specific embodiment of the particular configuration shown in FIG. 1, it is contemplated that the mounting plates 110 may have a longitudinal length of about 12 feet, that the entire mounting structure 100 may have a longitudinal length of about 20 feet, and that the entire mounting structure 100 may have a perpendicular length of about 18 feet to about 25 feet, with an overall height of about 10 feet. One notable advantage provided by the present embodiments is that the pieces that make up the mounting structure 100 may be made small enough and light enough to be carried up the stairs of a typical townhouse. This makes the use of an expensive crane to transport the structure to a rooftop unnecessary.

Figure 2:
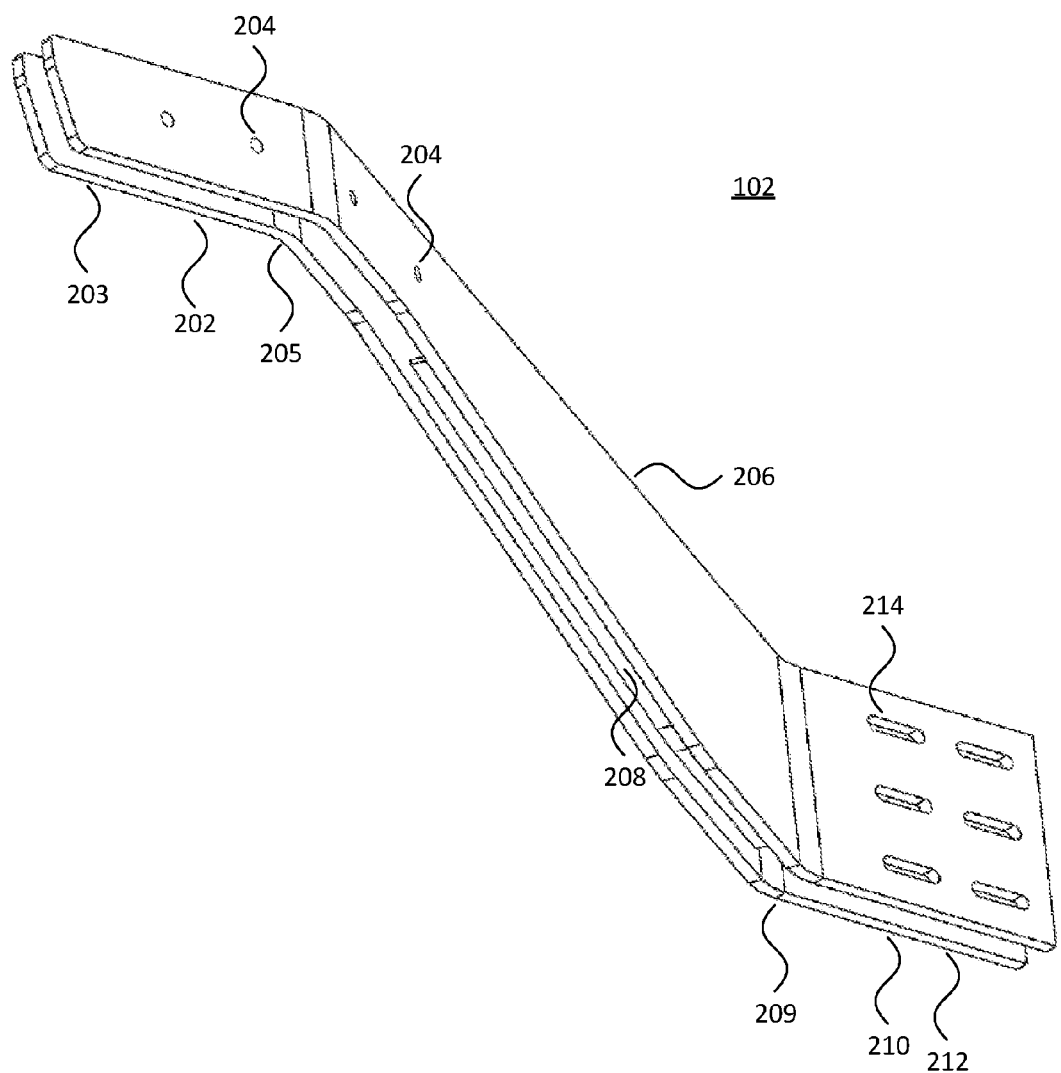
FIG. 2 is a diagram of a wishbone structure that forms a part of the mounting system in accordance with the present principles.

Referring now to FIG. 2, additional detail on the wishbone structure 102 is shown. The wishbone structure 102 is formed from three planar segments, connected to one another at respective angles. It should be noted that, although the segments are described separately herein, they may be formed from one contiguous piece of material. A first wishbone segment 202 has a vertical width that is less than that of the other wishbone segments and is configured to connect to one of the legs 108 via an insert 105. The first wishbone segment 202 is formed from two parallel plates 203 that define an interior space into which the insert 105 mounts. The first wishbone segment 202 furthermore has mounting holes 204 through which a bolt may be passed to attach the insert 105. Positioning the inserts 105 inside the interior space increases structural strength at the joints while maintaining a thin profile for aesthetic purposes.

It should be understood that, while bolts are described herein as being used to connect the pieces of the mounting system 100 together, alternative means of connection may be used instead. Examples of such alternative means may include friction fittings and welding.

The first wishbone segment 202 connects to second wishbone segment 206 at a bend 205. Each of the parallel plates 203 conform to the bend 205 to allow the insert 105 to continuously fill an initial portion of the second wishbone segment 206. The second wishbone segment 206 has a vertical width that increases from the vertical width of the first wishbone 202 segment to the vertical width of the third wishbone segment 210. This increase in vertical width may be continuous or graduated, may be linear or curvilinear, and may occur over the entire length of the second wishbone segment 206 or, as shown, over only an interior length of the second wishbone segment 206. The second wishbone segment 206 also includes mounting holes 204 to provide a strengthened connection to the insert 105.

It should be understood that the configuration of the insert 105 need not extend to the second wishbone segment 206 at all. In alternative configurations, the insert 105 may be limited to the first wishbone segment 202, with the second wishbone segment 206 forming a solid piece where the parallel plates 203 meet it. Outside of the initial portion of the second wishbone segment 206, where the insert 105 is mounted, it is contemplated that the second wishbone segment 206 is formed from a single piece of material or, alternatively, may be formed from multiple pieces that are welded together, with an optional channel 208 being formed in an underside thereof to provide space for the routing of wires, cables, lighting, aesthetic details, or other structures. The channel 208 may be present on both sides of the wishbone structure 102 or may be present only on a top edge or bottom edge.

The second wishbone segment 206 connects to the third wishbone segment 210 at a bend 209. The third wishbone segment is formed from parallel plates 212, which form an interior space that is filled by a splice connection 104. The third wishbone segment 210 includes mounting slots 214. According to one specific embodiment, the mounting slots 214 have a length in the horizontal direction that is greater than their length in the vertical direction, providing the ability to mount the splice connection 104 at various points along the length of the third wishbone segment 210.

In one specific embodiment, it is contemplated that the wishbone structures 102 may be formed from aluminum, to benefit from that material's lightweight strength, resistance to corrosion, and aesthetic appearance, but it should be understood that any appropriately rigid material may be used instead. It is specifically contemplated that carbon fiber may be used as an alternative to aluminum, with wood and steel also being contemplated. In addition, it although it is specifically contemplated that the segments of the wishbone structures 102 may be flat, to make bending possible with minimal distortion, curved or tubular structures may be used instead.

Figure 3:
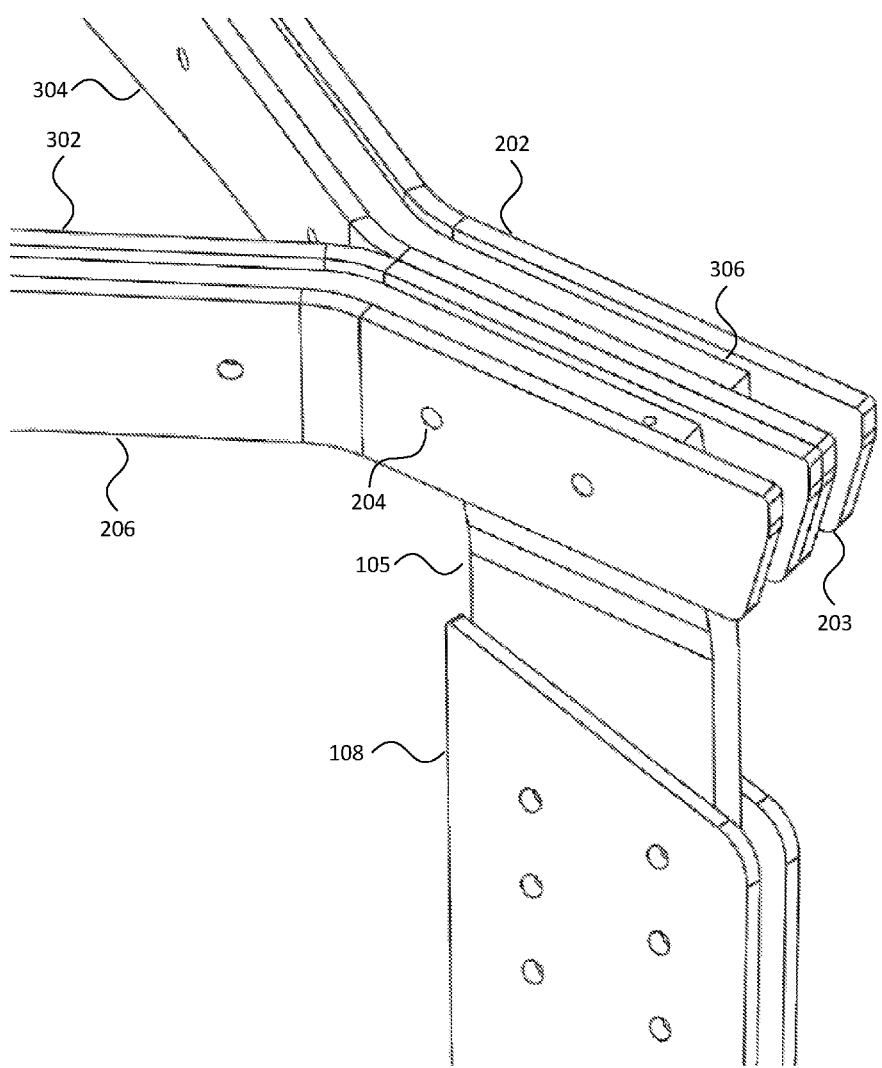
FIG. 3 is a diagram of a joint between two wishbone structures and a leg of the mounting system in accordance with the present principles.

In the specific example described above with respect to FIG. 1, exemplary dimensions of the wishbone structures 102 may have bends 205 and 209 that are about 30°, with the first bend 205 turning the second wishbone segment 206 out of parallel with the first wishbone segment 202 and with the second bend 209 turning the third wishbone segment 210 back into parallel with the first wishbone segment 202. It should be understood that any appropriate angle may be used, but it is specifically contemplated that both the first and third wishbone segments 202 and 210 may be arranged in parallel to make it easier to modularly expand the mounting structure 100 with the addition of more wishbone structures 102. As can be seen from the figure, the wishbone structure's vertical dimension changes across the segments, with one exemplary embodiment having a 6" vertical dimension where the wishbone structure 102 meets the leg 108 and a 12" vertical dimension where the wishbone structure 102 meets the central spine 106. Referring now to FIG. 3, additional detail is provided on the joint between the wishbone structures 102 and a leg 108. In particular, insert 105 is shown forming a joint between a first wishbone structure 302 and the leg 108. However, as shown in FIG. 1, a second wishbone structure 304 is also attached. In one embodiment (not shown), the insert 105 may have a double-pronged configuration such that it can attach to both wishbone structures 102 simultaneously. However, in the embodiment shown, a second insert 306 is used in the second wishbone structure 304 to provide structural support to that wishbone structure for the purpose of attaching the second wishbone structure 304 to the first wishbone structure 302. In this manner, a single bolt can pass through the holes 204 of the first and second wishbone structures 302 and 304 as well as insert 105 and insert 106 to securely connect all of the pieces together.

As noted above, the wishbone structures 102 may be formed from any appropriately rigid material. It is specifically contemplated that the inserts 105 and 306 may be formed from steel or some other strong material. It is also contemplated that inserts 105 and 306 have a bend in them to match the bend 205 of the wishbone structure 102 (e.g., about 30°).

Figure 4:
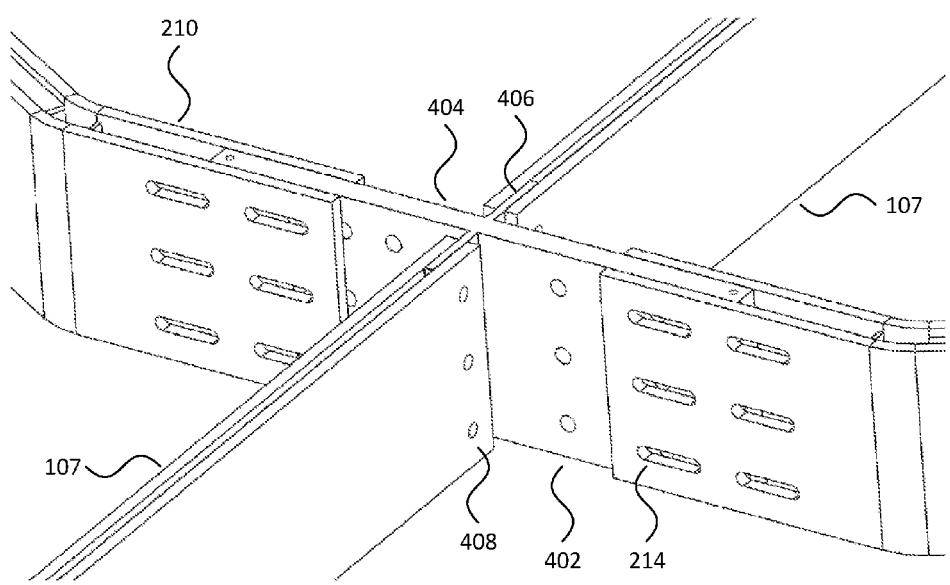
FIG. 4 is a diagram of an internal joint between two wishbone structures and the central spine of the mounting system in accordance with the present principles.

Referring now to FIG. 4, additional detail is shown on how the wishbone structures 102 connect to the central spine 106 at a first type of splice connection 104. In particular, FIG. 4 illustrates an internal splice connection 402, having a main body 404 that connects to the third wishbone segment 210 of two respective wishbone structures 102 and further having connecting fins 406 that connect to the spine pieces 107 on either side of the internal splice connection 402. The mounting slots 214 on the third wishbone segment 210 of the respective wishbone structures align with holes on the main body 404 of the internal splice connection 402. Mounting holes 408 on the spine pieces 107 similarly align with holes on the connecting fins 406.

Figure 5:
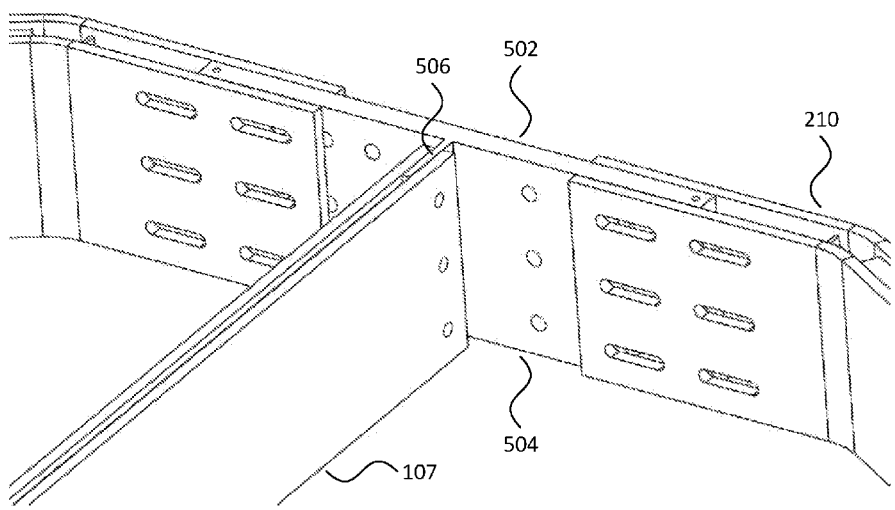
FIG. 5 is a diagram of an end joint between two wishbone structures and the central spine of the mounting system in accordance with the present principles.

Referring now to FIG. 5, additional detail is shown on how the wishbone structures 102 connect to the central spine 106 at a second type of splice connection 104. In this case, a T-splice connection 502 has a main body 504 and a connecting fin 506. The T-splice connection 502 is used for wishbone structures 102 at the outside of the mounting structure 100. The central spine 106 ends at such connections, so only one connecting fin 506 is needed. The T-splice connection 502 connects to the spine piece 107 and to the third wishbone segment 210 of the wishbone structures 102 in the same manner as the internal splice connection 402 discussed above.

Figure 6:
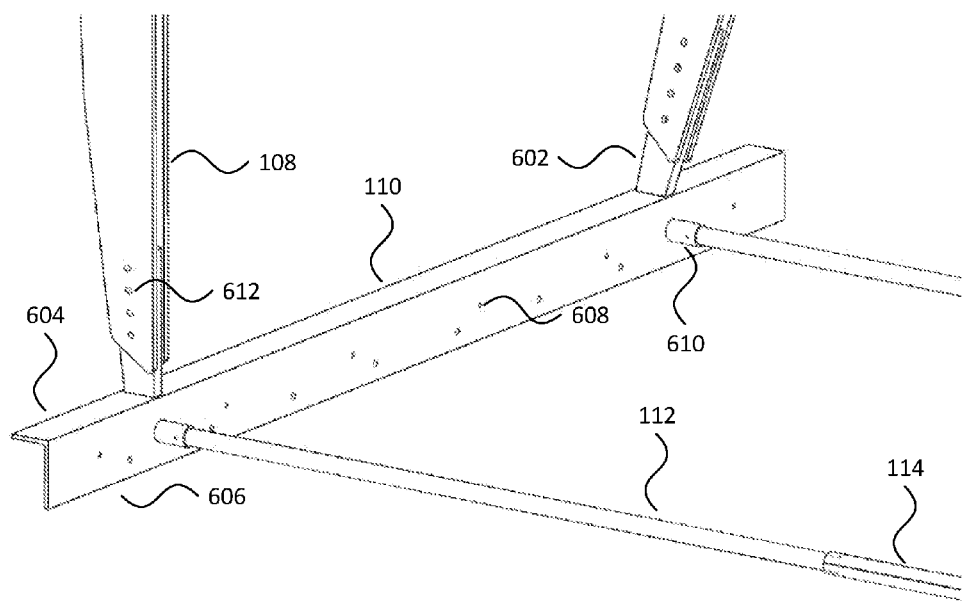
FIG. 6 is a diagram of the base plates and tension rods of the mounting system in accordance with the present principles.

Referring now to FIG. 6, additional detail is shown on how the legs 108 connect to the mounting plates 110. In particular, the legs 108 attach to upright structural mounting tabs 602 and are connected by means of bolts through holes 612. The upright structural mounting tabs 602 fit into an interior space of the legs 108 and may be formed as a single unit with the mounting plates 110 or may, alternatively, be separate pieces that are themselves attached to the mounting plates 110. The legs 108 angle outward in the longitudinal dimension to minimize the footprint of the mounting plates 110. The legs 108 furthermore angle inward in the perpendicular dimension to avoid conflicts that may be present on the existing structures, such as vent pipes or chimneys.

The mounting plates 110 themselves include a horizontal portion 604 and a vertical portion 606 that meet at an angle. It is specifically contemplated that the horizontal portion 604 and the vertical portion 606 meet at a right angle, but it should be understood that other angles are also possible. It should be understood that, although the upright structural mounting tabs 602 are shown as being connected to the horizontal portion 604, they may alternatively be connected to the vertical portion 606. The use of continuous mounting plates 110 along each side of the mounting structure 100 simplifies levelling and installation, as only one piece is needed per side (as opposed to using a separate mounting plate for each leg 108). In an alternative embodiment, however, each leg 108 may have a separate mounting plate 110, for example to accommodate a scenario where a chimney on a parapet would prevent the installation of a single, continuous mounting plate.

A series of attachment holes 608 are spaced along the vertical portion 606. The attachment holes 608 provide points for bolts to pass through the mounting plates 110 to attach the mounting plates 110 to a fixed structure such as, e.g., the parapets of a building's roof. A hole may be drilled into the parapet at the point of each roof attachment hole 608 to accommodate the bolt. When mounted on a fixed structure, the horizontal portion 604 rests on a top surface of the structure and the vertical portion 606 presses against a sidewall of the structure. In an alternative embodiment, the attachment holes 608 may be formed on the horizontal portion 604 such that a bolt may be put down into the fixed structure vertically. In an alternative embodiment, the mounting plates may have only horizontal portion 604 or only a vertical portion 606.

Expansive tension bars 112 are attached to the mounting plates 110 at attachment points 610 and maintain a hard connection between opposing mounting plates 110 to simplify the leveling process. It is specifically contemplated that the attachment points 610 may be formed as a single piece with the mounting plates 110, but it should be understood that other configurations are possible, where the attachment points 610 are separate structures that are attached to the mounting plates 110 in turn. The expansive tension bars 112 may be any variety of tension bar that is configured to prevent an outward force on the mounting plates 110.

The mounting system 100 provides a modular, expandable framework not only for the mounting of solar panels and other structures/architectural elements (e.g., functional shading by fabric or purely aesthetic elements) on top, but also for creating a usable space underneath. In particular, the shape created by the base plates 110 and attached legs 108 is fixed, making it possible to build and install modular attachments to the mounting system 100 such as, e.g., furniture, lighting, planters, and adornments. It is also contemplated that a deck may be installed to create flooring in the mounting system 100. Such a deck may span the entire width of the roof, with the addition of structural elements spanning from one mounting plate 110 to another. Such structural elements may include wood or metallic joists or trusses. The mounting plates 110 may include holes to facilitate mounting such structures, or may alternatively include pre-welded brackets or threaded rods. The deck may be formed from individual planks or, alternatively, may form a grid with modular pieces that provide openings for the modular installation of different flooring materials. In one example, a region of the deck may be used by a container for grass or a water feature.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of file transfer using an in-browser staging database (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A structure, comprising:
    a mounting system configured to mount the structure to an existing architectural feature;
    one or more legs, each connected to the mounting system;
    one or more wishbone structures, each wishbone structure comprising three flat sections connected at fixed angles with respect to one another, with end sections of each wishbone structure being parallel to one another, and each wishbone structure being connected to one of the one or more legs; and
    a central spine, to which each of the one or more wishbone structures is connected, comprising a plurality of spine pieces connected to one another and to the one or more wishbone structures by splice connections.

2. The structure of claim 1, wherein each splice connection slots into the respective spine pieces and wishbone structures as an insert.

3. The structure of claim 1, wherein each wishbone structure comprises a mounting slot to provide adjustable positioning for the connection between the wishbone structures and the respective splice connections.

4. The structure of claim 1, wherein a first pair of wishbone structures is connected to a second pair of wishbone structures across the central spine by way of a pair of splice connections.

5. The structure of claim 1, wherein each leg is connected to a respective wishbone structure of the one or more wishbone structures by an insert that slots into the leg and the respective wishbone structure as an insert.

6. The structure of claim 5, wherein a second wishbone structure is connected to a wishbone structure that is connected to a leg, said second wishbone structure comprising a supporting insert.

7. The structure of claim 1, wherein the mounting system comprises a pair of mounting plates, each mounting plate comprising a vertical surface and a horizontal surface.

8. The structure of claim 7, wherein the mounting system further comprises one or more tension bars that connect the pair of mounting plates.

9. The structure of claim 1, wherein the end sections of each of the one or more wishbone structures comprise a pair of parallel plates that defines an internal space.

10. A structure, comprising:
    a mounting system configured to mount the structure to an existing architectural feature;
    a plurality of legs, each connected to the mounting system;
    a central spine; and
    a plurality of wishbone structures, each wishbone structure comprising three flat sections connected at fixed angles with respect to one another, with end sections of each wishbone structure being parallel to one another, and each wishbone structure being connected to one of the plurality of legs at a first end by an insert that slots into the leg and the wishbone structure and to the central spine at a second end by a splice connection that inserts into the wishbone structure.

11. The structure of claim 10, wherein the central spine comprises a plurality of spine pieces connected to one another and to the plurality of wishbone structures by the splice connections.

12. The structure of claim 10, wherein each wishbone structure comprises a mounting slot to provide adjustable positioning for the connection between the wishbone structures and the respective splice connections.

13. The structure of claim 10, wherein a first pair of the plurality of wishbone structures is connected to a second pair of the plurality of wishbone structures across the central spine by way of a pair of splice connections.

14. The structure of claim 10, wherein a second wishbone structure is connected to a wishbone structure that is connected to a leg, said second wishbone structure comprising a supporting insert.

15. The structure of claim 10, wherein the mounting system comprises a pair of mounting plates, each mounting plate comprising a vertical surface and a horizontal surface.

16. The structure of claim 15, wherein the mounting system further comprises one or more tension bars that connect the pair of mounting plates.

17. The structure of claim 10, wherein the end sections of each of the plurality of wishbone structures comprise a pair of parallel plates that defines an internal space.

18. A structure, comprising:
- a mounting system configured to mount the structure to an existing architectural feature, comprising:
  - a pair of mounting plates, each mounting plate having a vertical surface and a horizontal surface; and
  - one or more tension bars that connect the pair of mounting plates;
- one or more legs, each connected to the mounting system; and
- one or more wishbone structures, each wishbone structure comprising three flat sections connected at fixed angles with respect to one another, with end sections of each wishbone structure being parallel to one another, and each wishbone structure being connected to one of the one or more legs.

\* \* \* \* \*